US006614786B1

United States Patent
Byers

(10) Patent No.: US 6,614,786 B1
(45) Date of Patent: Sep. 2, 2003

(54) ENHANCED DUAL MODE TELEPHONE FOR INTERNET TELEPHONY

(75) Inventor: Charles C. Byers, Aurora, IL (US)

(73) Assignee: Lucent Technologies Inc., Murray Hill, NJ (US)

( * ) Notice: Subject to any disclaimer, the term of this patent is extended or adjusted under 35 U.S.C. 154(b) by 0 days.

(21) Appl. No.: 09/448,740

(22) Filed: Nov. 24, 1999

(51) Int. Cl.[7] .......................... H04L 12/66; H04M 11/00
(52) U.S. Cl. .................... 370/353; 379/93.09; 379/494; 455/445
(58) Field of Search .................. 379/93.09, 112.05, 379/221.12, 93.01, 93.11, 93.26, 93.27, 88.03; 370/352, 493, 494, 495, 353; 455/445, 466, 3.01

(56) References Cited

U.S. PATENT DOCUMENTS

| 4,723,268 | A | * | 2/1988 | Newell et al. | ............ | 379/93.09 |
| 5,365,577 | A | * | 11/1994 | Davis et al. | ............. | 379/93.17 |
| 6,032,053 | A | * | 2/2000 | Schroeder et al. | .......... | 455/553 |
| 6,122,263 | A | * | 9/2000 | Dahlin et al. | ................ | 370/329 |
| 6,141,356 | A | * | 10/2000 | Gorman | ...................... | 370/493 |

OTHER PUBLICATIONS

Fisher "Dual Mode Mobile Unit For Generation Digital Narrow Channel Cellular Telephone System", IEEE, pp 543–547, Dec. 1988.*

* cited by examiner

Primary Examiner—Hassan Kizou
Assistant Examiner—Afsar M. Qureshi

(57) ABSTRACT

A dual mode Internet telephone is capable of operating as a tone/pulse dial telephone as well as with the Internet by transmitting dual-tone multi-frequency (DTMF) tones in response to dialing. The dual mode telephone includes a mode control switch which is either manually selectable to permit a user to choose between making a call over a standard telephone network or over the Internet or is automatically controlled to route the call via the more advantageous communications link depending upon various factors and considerations. In the standard telephone mode of operation, most of the Internet telephony circuit is disabled and the dial/touchtone keypad, earpiece and mouthpiece, and ringer are connected to the telephone line. In the Internet mode of operation, dialed digits are stored and converted to Internet telephony call set-up messages. The signals to/from the earpiece and mouthpiece are digitized, compressed and packetized by a digital signal processor. A built-in modem connects the digital signal processor and the call control messages through the standard telephone line to the Internet Service Provider (ISP). A control processor manages the connections and drives the keypad and ringer. A non-volatile memory stores configuration data such as the ISP number(s) to call and various other features related to the Internet mode of operation. The memory can also be programmed with other operating parameters for use by the control processor in an automatic mode of operation to override the manual switch and automatically place or receive a call via either the standard telephone network or the Internet.

20 Claims, 5 Drawing Sheets

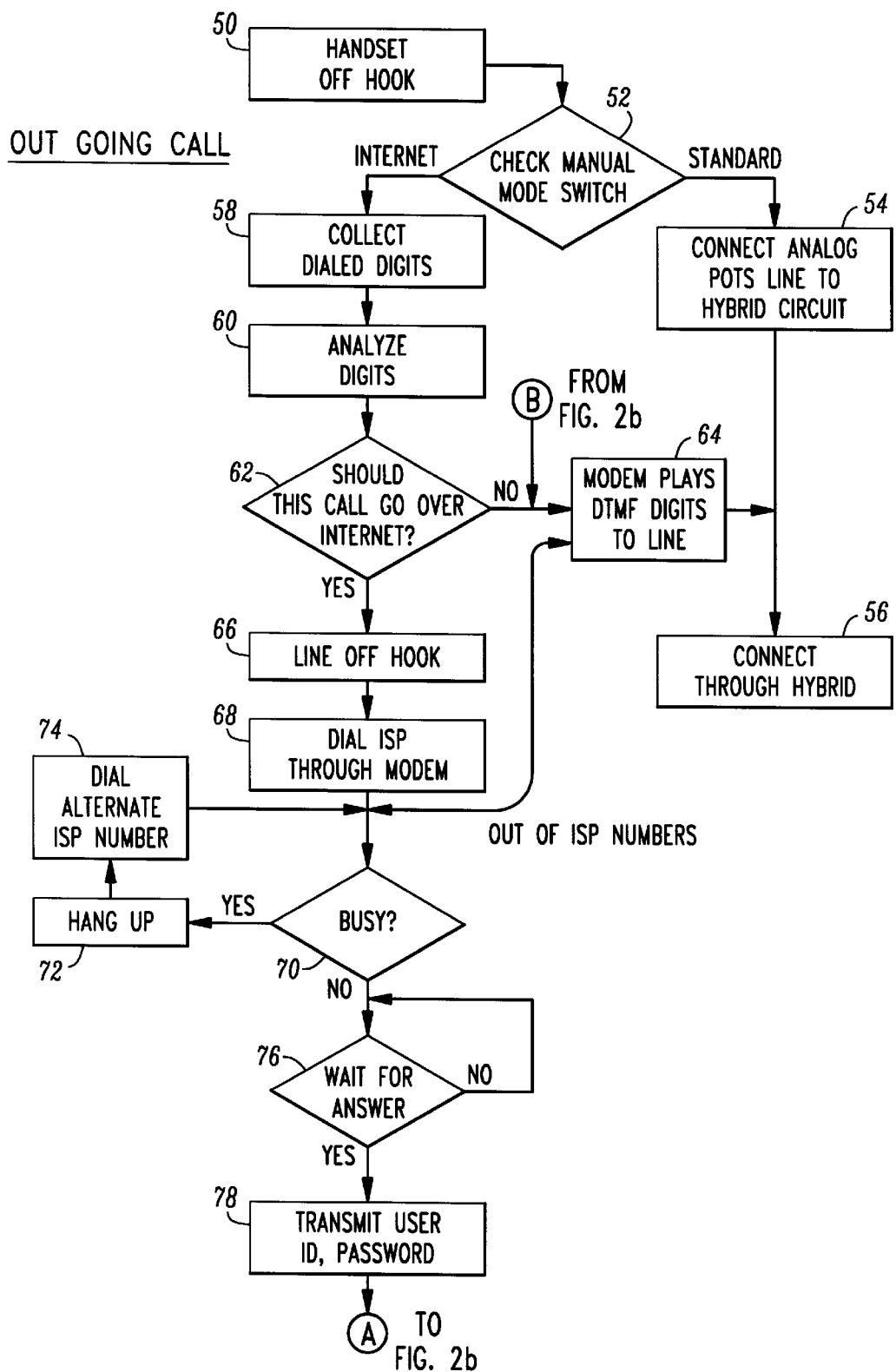

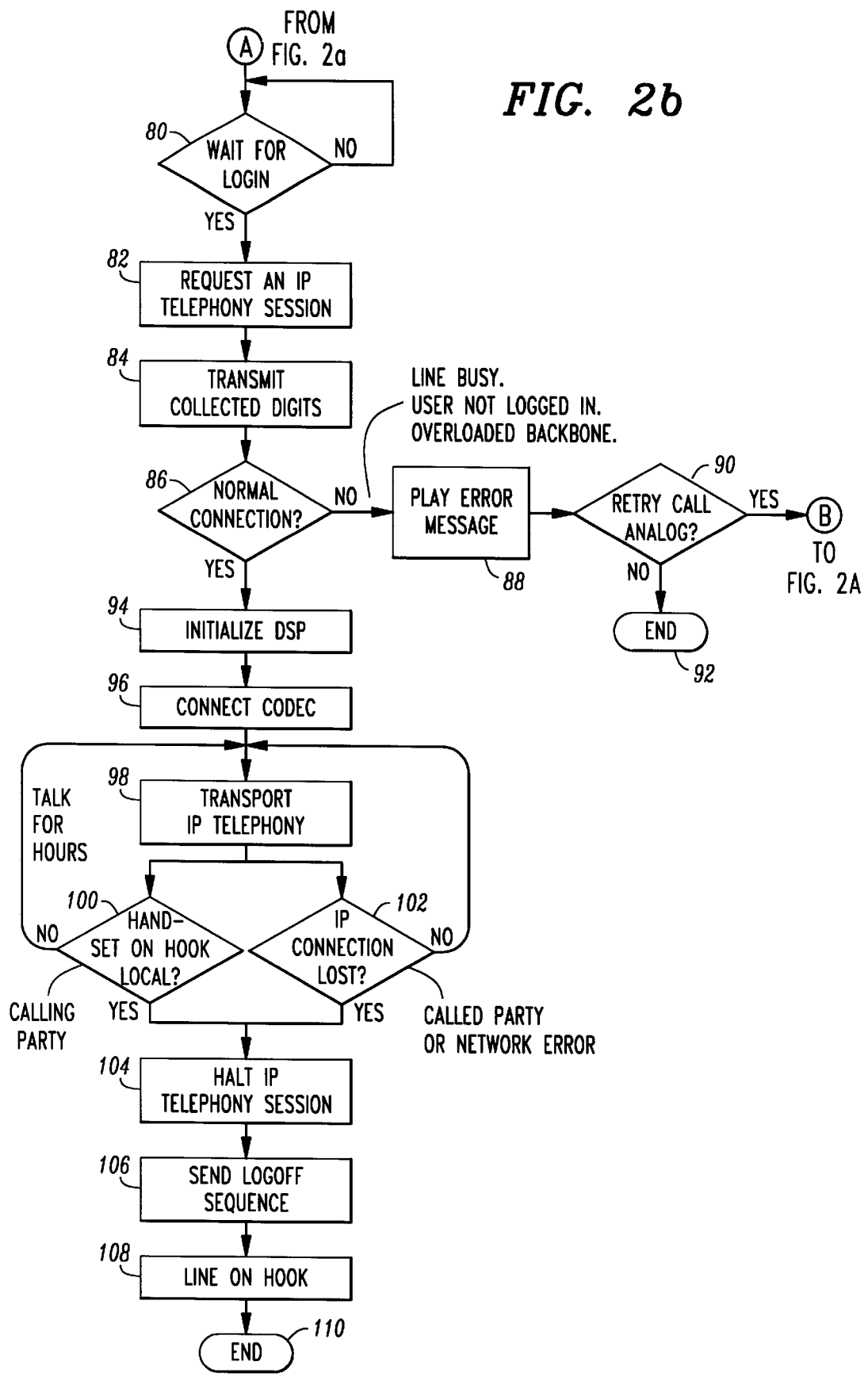

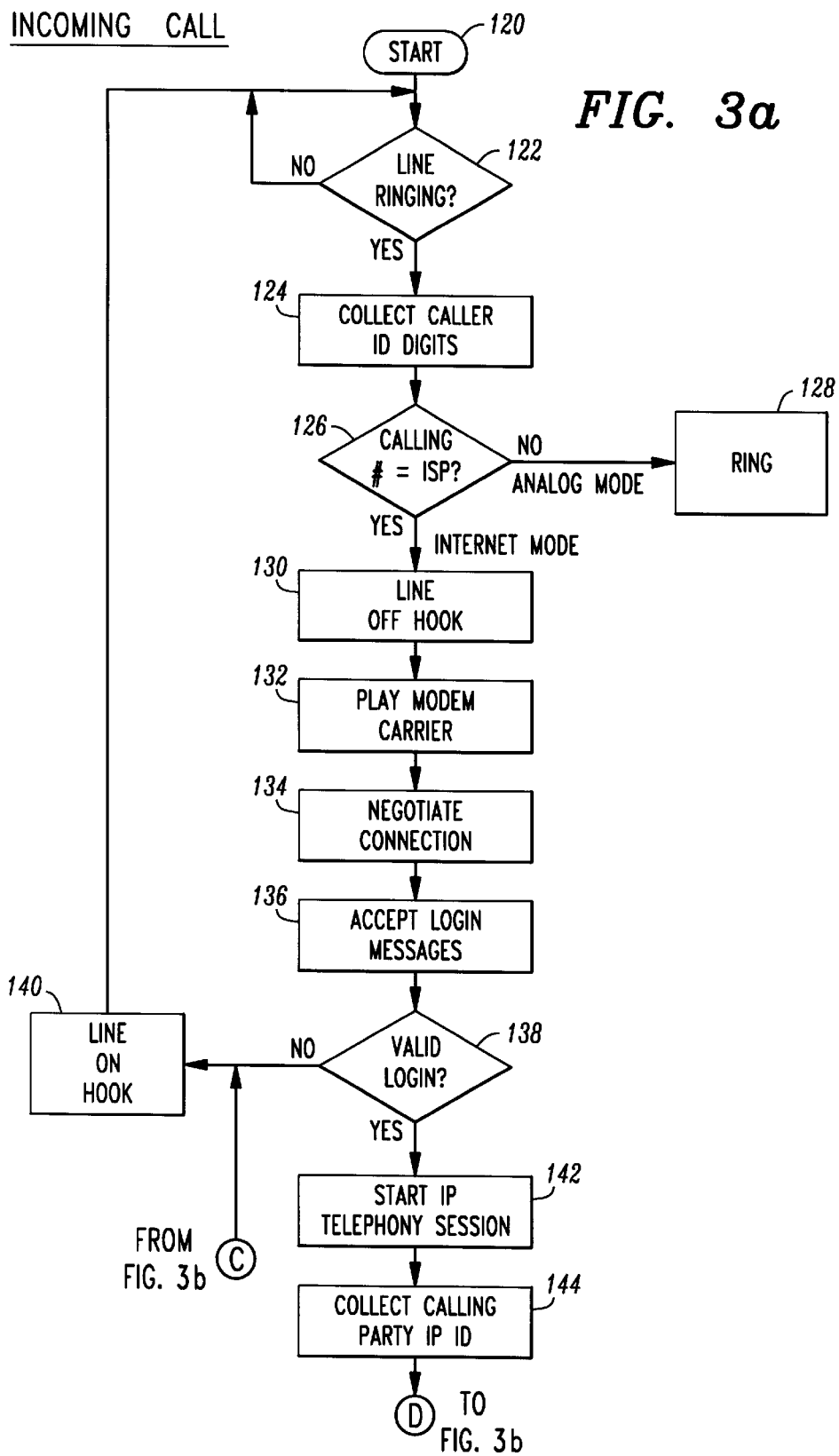

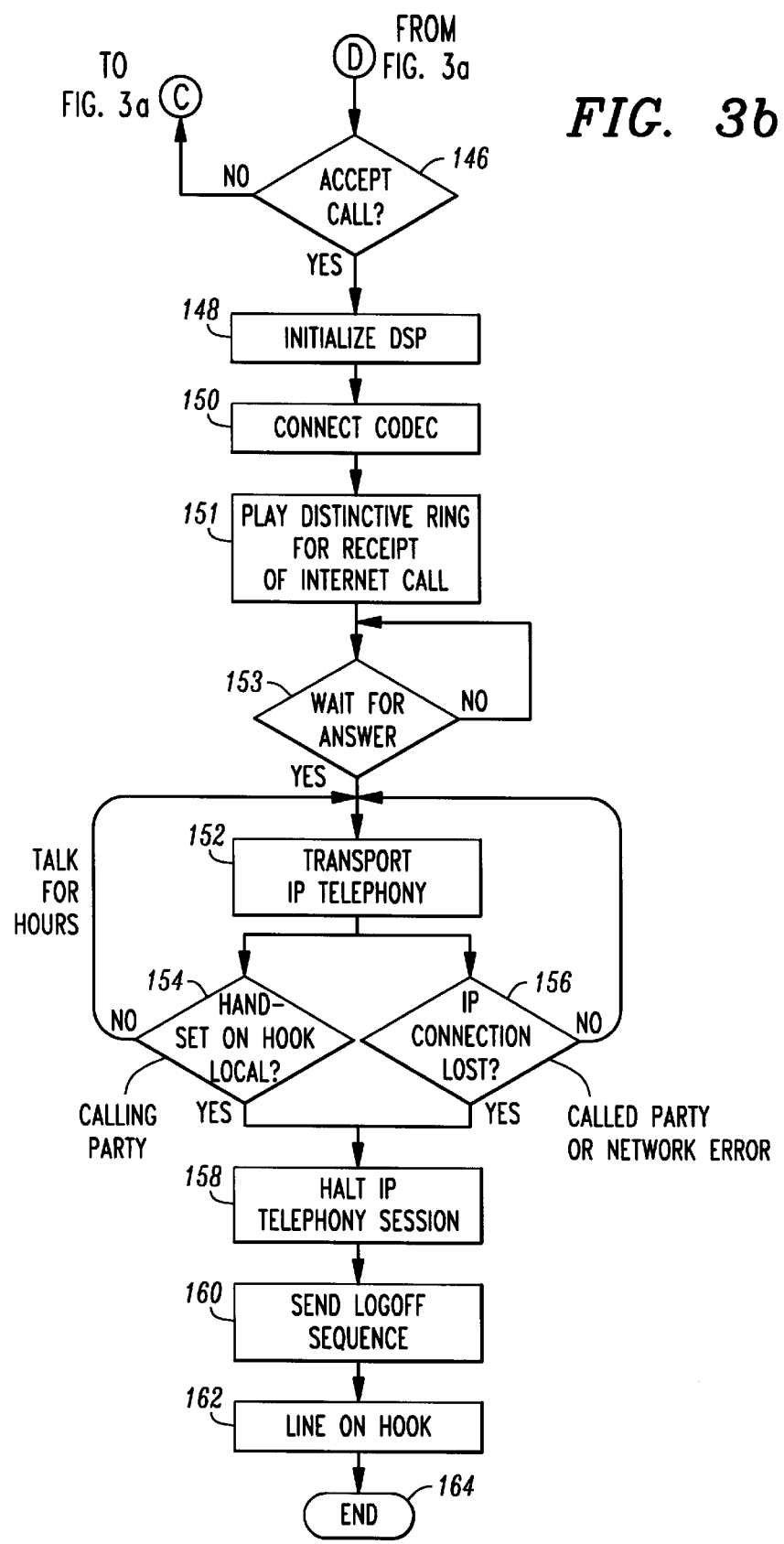

ENHANCED DUAL MODE TELEPHONE FOR INTERNET TELEPHONY

TECHNICAL FIELD

This invention relates generally to wireline communications systems and is particularly directed to a dual mode telephone capable of operating in either a standard telephone network or via the Internet.

BACKGROUND OF THE INVENTION

The cost per minute of Internet access is approaching, and may soon be less than, the cost per minute of long distance telephone service. As a result, increasing numbers of telecommunications users are using voice over the Internet to place toll calls rather than via a standard telephone network. The Internet provides acceptable voice quality at a cost much less than that of a traditional long distance call.

Using the Internet to make a phone call currently requires the user to initiate the call using a personal computer (PC) in combination with a modem to contact an Internet Service Provider (ISP). After initially contacting the ISP, the user must then go through a complex log-on process to gain access to the Internet. Once logged on, the user must then employ an Internet telephony software package in entering the number to be called. The network of the ISP then connects the user to the called party via the Internet. Many potential Internet telephony users find the complexity of this procedure unacceptable and refuse to use the Internet in this communications context in favor of the more familiar, traditional long distance telephone service. In addition, even after the user goes through the complex procedure to establish an Internet telecommunications link, communication via the Internet is not entirely reliable may not be possible for any of several reasons. For example, all ISP ports may be busy or there may be insufficient connection bandwidth available to the desired destination.

There are also available single mode, digital phones having access to the Internet via a Local Area Network (LAN). This is also not a particularly reliable communications link because of the limited availability of the LAN which is typically shared by a large number of users.

The present invention addresses the aforementioned limitations of the prior art by providing a dual mode Internet telephone have a selectable mode switch which is capable of communicating either via a standard toll telephone network or via the Internet and which automatically reverts to the standard toll telephone network operation when Internet telephony is not available.

SUMMARY OF THE INVENTION

This invention contemplates a dual mode Internet telephone with a mode control switch either of the manual type or which is processor controlled. The operation of the dual mode telephone is conceptually similar to current tone/pulse dialed telephones, where the user is able to control whether dial pulses or Dual Tone Multi-Frequency (DTMF) tones are sent in response to dialing. The inventive dual mode phone includes a Standard/Internet Mode Switch that allows the user to choose between making the call over a standard telephone network or via the Internet. A programmed processor may also be used to automatically control the mode of the switch. In the standard mode of operation, most of the advanced Internet telephony circuitry in the phone is disabled, and the dial/touchtone keypad, earpiece and mouthpiece, and ringer are connected to the metallic telephone line as in a standard telephone network. In the Internet mode of operation, when the user goes off hook, a connection is automatically established to a pre-programmed Internet Service Provider (ISP) number(s). The dialed digits are stored and converted to Internet telephony call set-up messages. The signals to/from the earpiece and mouthpiece are digitized, compressed and packetized by a digital signal processor. A built-in modem connects the digital signal processor and the call controlled messages through the standard telephone line to the ISP. A control processor manages the connections, and drives the keypad and ringer. A nonvolatile memory stores configuration data such as the ISP number(s) to call, and various Internet mode control information. The mode control switch may be automatically controlled by logic within the control processor which takes into consideration such information as the dialed digits, time of day, and other factors to determine if it is most advantageous to complete the call over the Internet or via the standard telephone network. Provision is made for the user to override the automatic selection of mode of communication. The dual mode Internet telephone can receive calls via the standard telephone network or the Internet. If the ISP is attempting to complete a connection to a subscriber with the inventive dual-mode telephone, the ISP calls the user's directory number and, based on detecting the caller ID of the ISP, the dual mode Internet telephone configures itself to an Internet mode, picks up the line and establishes a connection. The user then receives a distinctive ring and has the option to pick up the receiver and answer the call.

BRIEF DESCRIPTION OF THE DRAWINGS

The appended claims set forth those novel features which characterize the invention. However, the invention itself, as well as further objects and advantages thereof, will best be understood by reference to the following detailed description of a preferred embodiment taken in conjunction with the accompanying drawings, where like reference characters identify like elements throughout the various figures, in which:

FIGS. 2a and 2b are simplified flowcharts illustrating the steps carried out by means of a control processor in the dual mode telephone of the present invention in placing an outgoing call either via a standard telephone network or over the Internet; and FIGS. 3a and 3b are simplified flowcharts illustrating the steps carried out in receiving an incoming call either via a standard telephone network or over the Internet in accordance with another aspect of the present invention.

DETAILED DESCRIPTION OF THE PREFERRED EMBODIMENT

Figure 1:
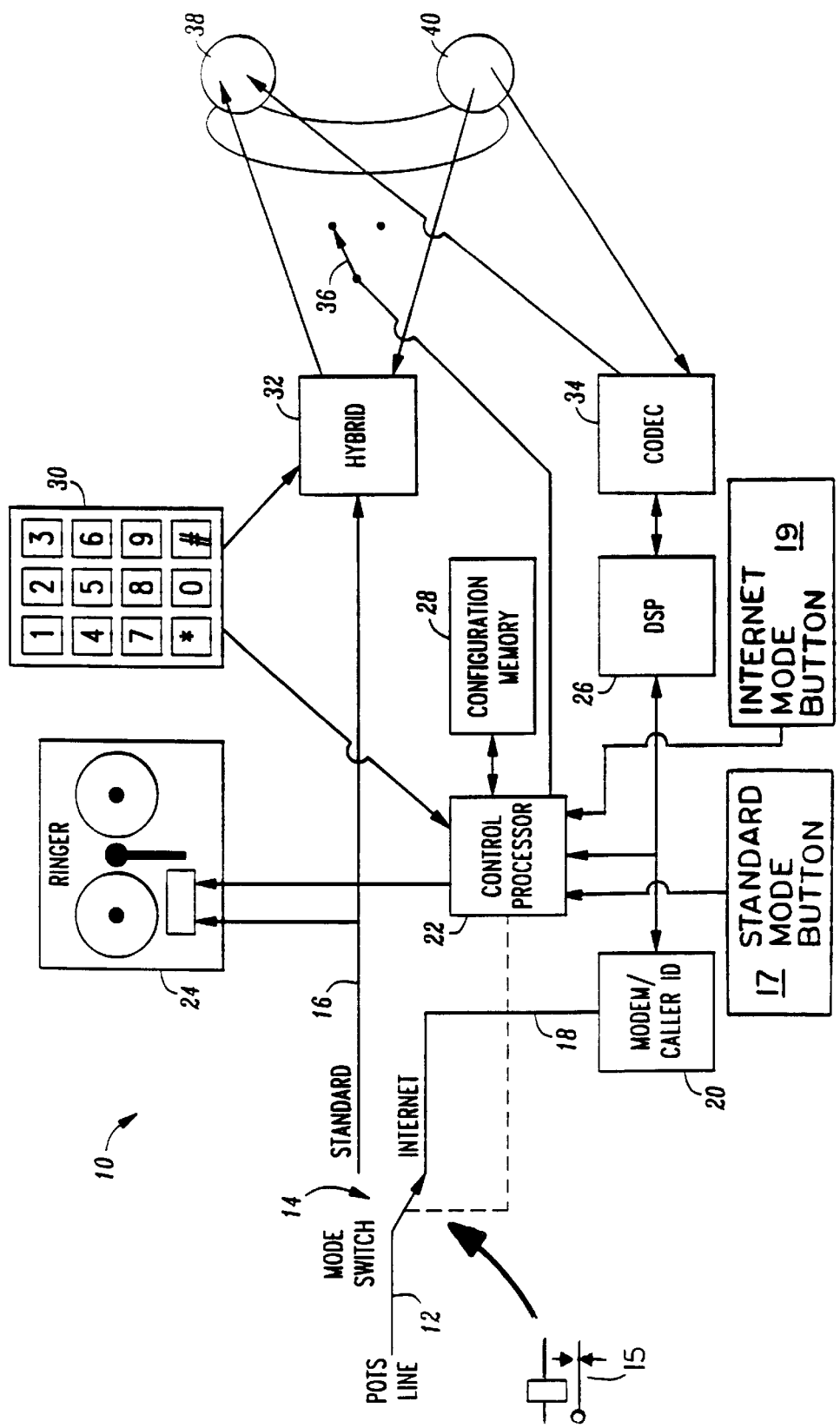
FIG. 1 is a simplified combined block and schematic diagram of a dual mode telephone system in accordance with the principles of the present invention.

Referring FIG. 1, there is shown a simplified combined block and schematic diagram of a dual mode telephone 10 in accordance with the principles of the present invention. The dual mode telephone 10 is connected to a Plain Old Telephone System (POTS) line 12 by means of a mode control switch 14. The mode control switch 14 is a two-position switch allowing the dual mode telephone 10 to be connected to either a standard telephone network or to a global information network such as the Internet. In a preferred embodiment, mode control switch 14 is in the form of a relay 15 having contacts which are normally closed. When relay 15 is not energized, relay 15 connects the POTS line 12 to a standard telephone line 16 for use in a standard mode of operation as shown in FIG. 1. When relay 15 is energized, relay 15 connects the POTS line 12 to an Internet line 18. In the event of a power supply failure, the relay 15 is de-energized and the telephone automatically operates via the standard telephone line 16. Mode control switch 14 is controlled either manually by a user of the dual mode telephone 10 or automatically by means a control processor 22 as described in detail below. In the manual mode of operation, either a standard mode button 17 connected to the control processor 22 for communicating via a standard telephone network or an Internet mode button 19 also connected to the control processor for communicating via the Internet is selected. In a preferred embodiment, the manual setting of the model control switch 14 can be overridden by the control processor 22 based upon data stored in a configuration memory 28. The configuration memory 28, which is a preferred embodiment is of the nonvolatile type, stores various system operating parameters and configuration data for use by the control processor 22 for automatically controlling the operation of the dual mode telephone 10. A ringer circuit 24 is connected to a standard telephone line 16 and operates in a conventional manner when actuated via the standard telephone line. Ringer circuit 24 is also coupled to and controlled by the control processor 22 when in the Internet mode of operation as described below. The standard telephone line 16 is connected to a conventional telephone hybrid circuit 32 which, in turn, is connected to an earpiece 38 and a mouthpiece 40 as is conventional. Hybrid circuit 32 is typically in the form of a network including resistors, capacitors and a low voltage transformer and has a first pair of leads connected to the standard telephone line 16 and second and third pairs of leads respectively connected to the earpiece 38 and mouthpiece 40. A keypad 30 is connected and provides inputs to the control processor 22 as well as DTMF signals to the hybrid circuit 32. The hybrid circuit 32 provides output signals for driving the earpiece 38 and receives outputs from the mouthpiece 40 for providing these audio signals to the standard telephone line 16. Also included in the dual mode telephone 10 is a two position switch hook 36. The ringer circuit 24, keypad 30, hybrid circuit 32 and the combination of earpiece 38 and mouthpiece 40 are standard components in a conventional telephone. When the dual mode telephone 10 of the present invention operates in the telephone mode of operation using the standard telephone line 16, these components operate in a manner similar to their operation in a conventional telephone. When the dual mode telephone 10 operates in the Internet mode of operation, these components operate under the control of the control processor 22 as described in detail below.

For use in the Internet mode of operation, the dual mode telephone 10 further includes a modem/caller identification (ID) unit 20 and a digital signal processor (DSP) 26. The modem/caller ID unit 20 allows Internet calls to be placed using a local telephone line to an Internet Service Provider (ISP). The caller ID provides for the situation where a user of the dual mode telephone 10 is engaged in a telephone call using the standard telephone line 16 and an incoming call is received via the Internet. The caller ID also detects the source of incoming calls and can determine whether an incoming call is from an ISP. The caller ID provision allows the user to decide whether to interrupt the call on the standard telephone line and accept the call from the Internet, or to continue the call on the standard telephone line. The DSP 26 provides for digitizing, compressing and packatizing signals to/from the earpiece 38 and mouthpiece 40. DSP 26 may also include a security provision for encrypting/de-encrypting the signals transmitted via the Internet. Earpiece 38 and mouthpiece 40 are connected to the DSP 26 by means of a coder/decoder (CODEC) 34. CODEC 34 converts the digital signals output by the DSP 26 to analog signals for use by earpiece 38. CODEC 34 also converts the analog signals output by the mouthpiece 40 to digital signals for use by the DSP 26. DSP 26 decompresses the digital signals from the CODEC 34 prior to providing these signals to the modem/caller ID 20. For example, CODEC 34 typically provides pulse code modulated (PCM) signals at the rate of 64 kbps to the DSP 26, with the DSP then compressing these digital signals to 5–32 kbps which is then provided to the modem/caller ID 20. The output of the DSP 26 to the modem/caller ID 20 is in the form of messages compatible with the Internet Protocol (IP). DSP 26, on the other hand, decompresses the digital signals output by the modem/caller ID 20 prior to providing these signals to the CODEC 34. Components which could be used in the dual model telephone 10 include the following: for the control processor 22, an 8051 Intel signal chip microprocessor; for the modem/caller ID 20, a standard V90 modem chip set such as available from Lucent Technologies, Inc. or Rockwell International, Inc.; and DSP 26 could be in the form of a Lucent Technologies 1610 or Texas Instruments 548 digital signal processor.

The configuration memory 28 may be programmed with various information relating to the standard telephone network as well as to the Internet for completing telephone calls via either communications link. Examples of information which could be stored in the configuration memory 28 for recall and use by the control processor 22 would include an Internet user ID number, a password for Internet access, and the telephone number of the ISP, as well as any alternate numbers for other ISP's when the primary ISP number is busy. In addition, it may be desirable to place all calls to certain numbers via either the standard telephone network or via the Internet. In this case, a number dialed using keypad 30 would be compared by the control processor 22 with numbers stored in the configuration memory 28 for automatically routing the dialed number via either the standard telephone network or via the Internet. It may also be desirable to automatically route calls made at a certain time of the day, on a certain day of the week, or to certain designated area codes via the Internet. This automatic call routing is accomplished by the control processor 22 which reads this information from the configuration memory 28 and automatically routes the call via either the standard telephone network or via the Internet. It may also be desirable during a call on the standard telephone network to automatically switch to an incoming call on the Internet for certain calling numbers. This, too, would be accomplished by the control processor 22 in accordance with data stored in the configuration memory 28. This type of operating and control data could be stored in the configuration memory 28 by appropriate entries on keypad 30 using the control processor 22.

Referring to FIGS. 2a and 2b, there are shown simplified flowcharts illustrating the steps carried out by means of the control processor 22 in the dual mode telephone 10 in placing an outgoing call either via a standard telephone network or over the Internet in accordance with one aspect of the present invention. In these flowcharts, a rectangular symbol represents an instruction or set of instructions resulting in the performance of a control function, while a diamond indicates a decision point based upon the comparison of binary signal inputs. An oval represents the start of an operation, while a circular symbol represents the transition between consecutive flowcharts in carrying out a sequence of steps in accordance with the present invention. The steps represented in the flowcharts are carried out by means of a program stored in the control processor 22 which writes data into and reads data from the configuration memory 28 in controlling the operation of the various components of the dual mode telephone 10 shown in FIG. 1 as described below.

An outgoing call is initiated at step 50 when the telephone handset is placed off hook. Following detection of a handset off hook condition, the program stored in the control processor 22 proceeds to step 52 and checks for the status of the mode control switch 14. If the mode control switch 14 is determined at step 52 to be in the standard mode of operation, the program branches to step 54 and connects the analog POTS line 12 to the hybrid circuit 32 at step 54. The program then proceeds to step 56 and connects the outgoing call via the hybrid 32 and mode control switch 14 to the POTS line 12.

If at step 52, it is determined that the mode control switch 14 is in the Internet mode, the program branches to step 58 and collects the dialed digits entered by the user via the keypad. The program then proceeds to step 60 and analyzes the dialed digits, followed by a determination at step 62 if the call should be transmitted over the Internet. This analysis of the dialed digits would typically involve a comparison of the dialed digits with telephone numbers stored in and read from the configuration memory 28 by the control processor 22. If it is determined at step 62 that the call is not to be transmitted via the Internet, the program branches to step 64 and dual-tone multi-frequency tones are generated by the DSP 26 and transmitted through the modem/caller ID unit 20 to the POTS line 12 via the mode control switch 14. The dual mode telephone 10 is then connected to the POTS line 12 through the hybrid circuit 32 for directing the call to the standard telephone network.

If at step 62, it is determined that the call is to be transmitted via the Internet, the program at step 66 then accesses the POTS line 12 by executing a line off hook operation. The program then dials the number of the designated Internet service provider (ISP) through the modem/caller ID 20 at step 68. The designated ISP telephone number is stored in the configuration memory 28 and is automatically dialed by means of the control processor 22 for accessing the ISP. If a busy signal is detected at step 70, the program hangs up the dual mode telephone 10 at step 72 and, after a predetermined time period, dials the ISP alternate number at step 74 and continues this process until a busy signal is not received and a call is placed to the ISP. The program then waits for an answer at step 76. When the call is answered at the ISP, the program then transmits the user identification (ID) number and an Internet password at step 78. This information is stored in the configuration memory 28 and is read from the memory by the control processor 22. The program then at step 80 waits for a login on the Internet. After an Internet login occurs, the program at step 82 requests an Internet Protocol (IP) telephony session. At step 84, the program then transmits the collected digits of the called number and determines at step 86 if a normal connection has been established with the Internet. If at step 86 a normal connection to the Internet is not detected, the program then plays an error message 88 over the dual mode telephone's earpiece 38 at step 88. The error message may be programmed into the DSP 26 and played back to the user in the event a normal Internet connection is not established. The error message may be in the form of a tone, or a series of tones, or may be a voice message. Failure to establish a normal connection with the Internet may be due to a line to the ISP being busy, the caller not being properly logged in, or an overloaded backbone on the Internet. Following playing of the error message to the user at step 88, the program then attempts again at step 90 to call the desired number, but this time via the analog POTS line 12. If the attempted call is not established via the POTS line 12, the program stored in the control processor 22 terminates the outgoing call procedure at step 92. If contact with the desired number is established via the analog POTS line at step 90, the program then branches back to step 64 with the modem/caller ID 20 providing the DTMF digits to the, POTS line 12. Connection to the dialed number is then established at step 56 through the hybrid circuit 32 via the POTS line 12.

If at step 86 normal connection is established with the ISP, the program proceeds to step 94 and initializes the DSP 26. After the DSP 26 is initialized, the program then connects the CODEC 34 at step 96 with the earpiece 38 and mouthpiece 40. The program then at step 98 initiates the IP telephony session. The program continues with the IP telephony session at step 98 until either a handset on hook is detected for the local call at step 100 or a loss of the IP connection is detected at step 102. In the latter case, an IP lost connection is due to either a called party or a network error. Following either the detection of a handset on hook or a loss of the IP connection, the program then terminates the IP telephony session at step 104 followed by the transmission of a logoff sequence at step 106. The POTS line is then placed on hook at step 108 followed by the end of the outgoing call routine at step 110. The handset on hook signal is provided to the control processor 22 from a handset-coupled switch hook 36.

Referring to FIGS. 3a and 3b, there are shown flowcharts illustrating the steps carried out by the control processor 22 in the case of an incoming call to the dual mode telephone of the present invention. The incoming call routine is initiated at step 120 followed by the detection of a line ringing signal at step 122. Following detection of a line ringing signal, the program then collects the caller ID at digits at step 124 and then at step 126 determines if the calling number corresponds to the number of an ISP. A comparison is made here by the control processor 22 of the calling member with ISP numbers stored in the configuration memory 28. If the calling number does not correspond with the number of an ISP, the program branches to step 128 and initiates ringing of the dual mode telephone in the analog mode with the received call transmitted via the POTS line 12. If at step 126, it is determined that the calling number corresponds to an ISP number, the program then initiates the Internet mode of operation by placing the line off hook at step 130. The dual mode telephone then places a modem carrier signal on the POTS line 12 at step 132 and the control processor 22 negotiates an Internet connection for the incoming call at step 134. In negotiating the Internet connection, such system parameters as data rates, echo cancellation and signal compression are taken into consideration by the control processor 22 using data stored in the configuration memory 28. Login messages are then accepted at step 136 by verifying the ISP with data stored in the configuration memory 28. The program then checks to determine if the login is valid at step 138, and if it is determined that the login is not valid, the program branches to step 140, places the line on hook, and returns to the start of the program to detect if the line is ringing at step 122. The line on hook operation is performed by a relay (not shown) in the modem/caller ID 20. If at step 138, it is determined that the login is valid, the program proceeds to step 142 for initiating the start of an IP telephony session. The calling party ID is then collected over the IP connection at step 144, followed by a decision to either accept or reject the call at step 146. The decision to accept the call at step 146 is based upon a comparison by the control processor 22 of the calling number with pre-programmed directory numbers stored in the configuration memory 28. If the call is not accepted at step 146, the program branches to step 140 and places the line on hook, followed by a return to step 122 for detection of a line ringing signal. Receipt of a call over the Internet may be indicated to a user by providing a distinctive ring at the receiving telephone. If at step 146 the call is accepted, the program initializes the DSP at step 148 and connects the CODEC with the earpiece 38 and mouthpiece 40 at step 150. A distinctive line ringing signal identifying the call as received via the Internet is then provided at the receiving telephone by means of a ringer circuit at step 151. The program then at step 153 waits for the call to be answered, i.e., for the telephone receiver to be picked up. The program then at step 152 initiates the IP telephony session at step 152. The IP telephony continues until either the handset on hook is detected locally at step 154 or the IP connection is lost as detected at step 156. Once the handset on hook is detected or the IP connection is lost, the program then proceeds to step 158 and terminates the IP telephony session followed by the sending of an Internet logoff sequence at step 160. The program then places the line on hook at step 162, followed by the end of the incoming call routine at step 164.

While particular embodiments of the present invention have been shown and described, it will be obvious to those skilled in the art that changes and modifications may be made without departing from the invention in its broader aspects. Therefore, the aim in the appended claims is to cover all such changes and modifications as fall within the true spirit and scope of the invention. The matter set forth in the foregoing description and accompanying drawing is offered by way of illustration only and not as a limitation. The actual scope of the invention is intended to be defined in the following claims when viewed in their proper perspective based on the prior art.

I claim:

1. A dual mode telephone including a ringer circuit, an earpiece, a mouthpiece and an alphanumeric character selector for use with a telephone network in a first mode of operation or with a global information network in a second mode of operation, said dual mode telephone comprising:
   a configuration memory storing first data for said first mode of operation and second data for said second mode of operation;
   a control processor coupled to said configuration memory and to said alphanumeric character selector and responsive to user-initiated inputs to said alphanumeric character selector for reading either said first data or said second data from said configuration memory in accordance with said user initiated inputs;
   an analog signal circuit coupled to the earpiece and mouthpiece for use in the first mode of operation;
   a digital signal circuit coupled to the earpiece and mouthpiece for use in the second mode of operation; and
   a mode control switch coupled to said control processor and responsive to a manual user selection for connecting the analog signal circuit to the telephone network for use in the first mode of operation or for connecting the digital signal circuit to the global information network in the second mode of operation, wherein said mode control switch is further coupled to said control processor for automatically connecting said analog signal circuit to the telephone network or said digital signal circuit to the global information network in accordance with said first or second data read from said configuration memory by said control processor.

2. The dual mode telephone of claim 1 wherein said configuration memory stores either said first data for said first mode of operation or said second data for said second mode of operation for a given called number.

3. The dual mode telephone of claim 2 wherein said user-initiated inputs are defined in terms of various operating parameters.

4. The dual mode telephone of claim 3 wherein said various operating parameters include a called number, a time of day, a day of the week, or an area code.

5. The dual mode telephone of claim 4 wherein said dual mode telephone is connected to the global information network by a global information network provider, and wherein a directory number associated with said global network provider is stored in and read from said configuration memory by said control processor.

6. The dual mode telephone of claim 5 further comprising plural information network providers for connecting the dual mode telephone to the global information network, and wherein plural alternate directory numbers each associated with a respective global network provider are stored in and read from said configuration memory by said control processor.

7. The dual mode telephone of claim 1 wherein said analog signal processor includes a hybrid circuit having a low voltage transformer.

8. The dual mode telephone of claim 1 wherein said digital signal circuit includes a modem for connecting the earpiece and mouthpiece to the global information network via the telephone network and said mode control switch.

9. The dual mode telephone of claim 8 wherein said digital signal circuit further includes a digital signal processor for compressing signals provided by the mouthpiece to said modem and for decompressing signals provided from said modem to the earpiece.

10. The dual mode telephone of claim 9 wherein said digital signal processor decrypts signals provided by said modem to the earpiece and encrypts signals provided from the mouthpiece to said modem.

11. The dual mode telephone of claim 10 wherein said digital signal circuit further includes a coder/decoder for decoding signals provided by said modem to the earpiece and for encoding signals provided from the mouthpiece to said modem.

12. The dual mode telephone of claim 1 wherein said mode control switch comprises a relay with first and second sets of contacts, and wherein said first set of contacts are closed in said first mode of operation and open in said second mode of operation and said second set of contacts are open in said first mode of operation and are closed in said second mode of operation.

13. The dual mode telephone of claim 12 wherein said first set of contacts are closed in said first mode of operation upon a loss of power to the dual mode telephone for use with the telephone network.

14. The dual mode telephone of claim 1 further comprising first and second control buttons coupled to said control processor for operating with the telephone network upon selection of said first control button or for operating with the global information network upon selection of said second control button.

15. The dual mode telephone of claim 1 wherein said configuration memory is a nonvolatile memory.

16. The dual mode telephone of claim 1 wherein a distinctive ringing signal is provided to the dual mode telephone to identify a call received via the global information network.

17. A method for communicating via either a telephone network or a global information network, said method comprising the steps of:
   storing first and second data in a memory for respectively communicating either via the telephone network or via the global information network, wherein communication is established via either the telephone network by said first data or the global information network by said second data in accordance with various operating parameters;
   manually selecting to communicate via either the telephone network or the global information network; or
   in the absence of a manual selection to communicate via either the telephone network or the global information network, reading either said first or said second data from said memory depending upon said various operating parameters; and
   communicating by the telephone network if said first data is read from said memory or by the global information network if said second data is read from said memory.

18. The method of claim 17 wherein the step of manually selecting to communicate via either the telephone network or the global information network includes providing user-initiated inputs defined in terms of various operating parameters.

19. The method of claim 18 further comprising the step of defining said first and second data in terms of said various operating parameters.

20. The method of claim 19 wherein said various operating parameters include a called number, a time of day, a day of the week, or an area code of a called number.

* * * * *